US012704900B2

(12) United States Patent
Halmetschlager-Funek et al.

(10) Patent No.: US 12,704,900 B2
(45) **Date of Patent: *Aug. 11, 2026**

(54) PERIODIC PARAMETER ESTIMATION FOR VISUAL-INERTIAL TRACKING SYSTEMS

(71) Applicant: Snap Inc., Santa Monica, CA (US)

(72) Inventors: Georg Halmetschlager-Funek, Vienna (AT); Matthias Kalkgruber, Vienna (AT); Daniel Wolf, Mödling (AT); Jakob Zillner, Absdorf (AT)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,124

(22) Filed: Dec. 5, 2024

(65) Prior Publication Data

US 2025/0093948 A1 Mar. 20, 2025

Related U.S. Application Data

(63) Continuation of application No. 18/116,511, filed on Mar. 2, 2023, now Pat. No. 12,210,672, which is a (Continued)

(51) Int. Cl.
*G06F 3/01* (2006.01)
*G06F 3/038* (2013.01)
*H04L 67/131* (2022.01)

(52) U.S. Cl.
CPC .............. *G06F 3/012* (2013.01); *G06F 3/038* (2013.01); *H04L 67/131* (2022.05); *G06F 2203/0383* (2013.01)

(58) Field of Classification Search
CPC .. G06F 3/012; G06F 3/038; G06F 2203/0383; H04L 67/131
See application file for complete search history.

(56) References Cited

U.S. PATENT DOCUMENTS

2015/0193949 A1* 7/2015 Katz ..................... G06T 19/006 345/8
2016/0014404 A1* 1/2016 Krestyannikov ........ G02B 7/38 348/187

(Continued)

OTHER PUBLICATIONS

"U.S. Appl. No. 18/116,511, Final Office Action mailed Jun. 20, 2024", 16 pgs.

(Continued)

*Primary Examiner* — Ariel A Balaoing
(74) *Attorney, Agent, or Firm* — Schwegman Lundberg & Woessner, P.A.

(57) ABSTRACT

A method for calibrating a visual-inertial tracking system is described. A device operates the visual-inertial tracking system without receiving a tracking request from a virtual object display application. In response to operating the visual-inertial tracking system, the device accesses sensor data from sensors at the device. The device identifies, based on the sensor data, a first calibration parameter value of the visual-inertial tracking system and stores the first calibration parameter value. The system detects a tracking request from the virtual object display application. In response to the tracking request, the system accesses the first calibration parameter value and determines a second calibration parameter value from the first calibration parameter value.

20 Claims, 12 Drawing Sheets

Related U.S. Application Data continuation of application No. 17/301,655, filed on Apr. 9, 2021, now Pat. No. 11,662,805.

(60) Provisional application No. 63/131,981, filed on Dec. 30, 2020.

(56) References Cited

U.S. PATENT DOCUMENTS

2017/0045736 A1* 2/2017 Fu ........................ G02B 27/017
2018/0018791 A1* 1/2018 Guoyi ....................... G06T 7/80
2018/0096519 A1* 4/2018 Tokubo ................... A63F 13/56
2021/0117722 A1* 4/2021 Kal ......................... H04N 23/90
2021/0118218 A1* 4/2021 Huang .................. G06T 19/006
2022/0075447 A1* 3/2022 Guo ..................... H04N 17/002

OTHER PUBLICATIONS

"U.S. Appl. No. 18/116,511, Non Final Office Action mailed Feb. 27, 2024", 17 pgs.
"U.S. Appl. No. 18/116,511, Notice of Allowance mailed Sep. 25, 2024", 7 pgs.
"U.S. Appl. No. 18/116,511, Response filed Apr. 29, 2024 to Non Final Office Action mailed Feb. 27, 2024", 12 pgs.
"U.S. Appl. No. 18/116,511, Response filed Sep. 17, 2024 to Final Office Action mailed Jun. 20, 2024", 12 pgs.
"Korean Application Serial No. 10-2023-7025816, Notice of Preliminary Rejection mailed Mar. 20, 2025", W/English Translation, 9 pgs.
"Korean Application Serial No. 10-2023-7025816, Response filed May 19, 2025 to Notice of Preliminary Rejection mailed Mar. 20, 2025", w/ English claims, 28 pgs.

* cited by examiner

PERIODIC PARAMETER ESTIMATION FOR VISUAL-INERTIAL TRACKING SYSTEMS

CROSS REFERENCE

The present application is a continuation of U.S. patent application Ser. No. 18/116,511, filed Mar. 2, 2023, which is a continuation of U.S. patent application Ser. No. 17/301,655, filed Apr. 9, 2021, now issued as U.S. Pat. No. 11,662,805, which claims priority to U.S. Provisional Patent Application Ser. No. 63/131,981, filed Dec. 30, 2020, all of which are hereby incorporated by reference in their entirety.

TECHNICAL FIELD

The subject matter disclosed herein generally relates to a visual tracking system. Specifically, the present disclosure addresses systems and methods for calibrating visual-inertial tracking systems.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system is typically factory calibrated (based on predefined/known relative positions between the cameras and other sensors) to accurately display the virtual content at a desired location relative to its environment. However, factory calibration parameters can drift over time as the user wears the AR/VR device due to mechanical stress and temperature changes in the AR/VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
FIG. 1 is a block diagram illustrating an environment for operating an AR/VR display device in accordance with one example embodiment.
Figure 1:
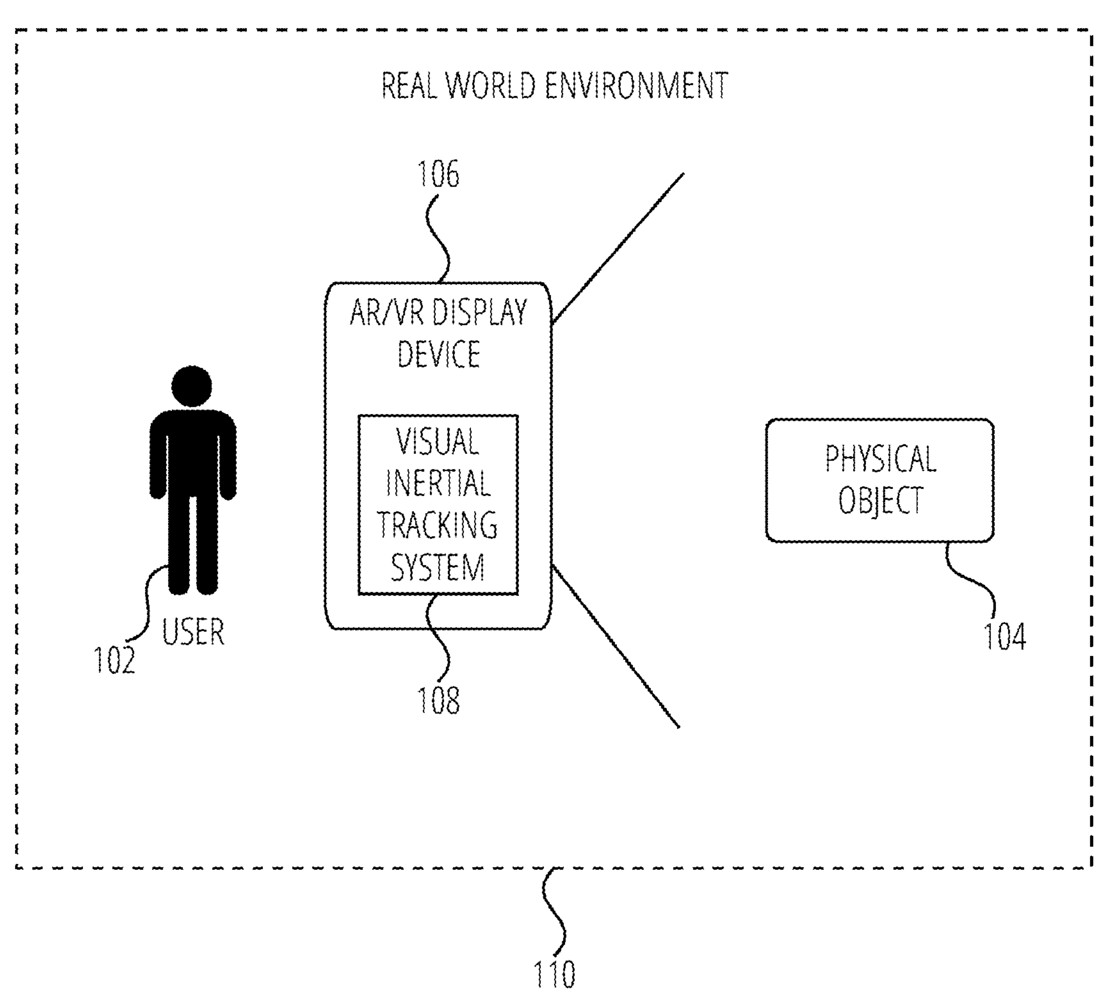

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

Both AR and VR applications allow a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). In order to do this, the AR display device detects the physical object and tracks a pose of the AR display device relative to a position of the physical object. A pose identifies a position and orientation of the display device relative to a frame of reference or relative to another object. For VR, the virtual object appears at a location based on the pose of the VR display device. The virtual content is therefore refreshed based on the latest pose of the device.

A tracking system (also referred to as a visual-inertial tracking system) at the display device determines the latest position or pose of the display device. An example of a tracking system includes a visual-inertial tracking system (also referred to as visual odometry system) that relies on data acquired from multiple sensors (e.g., depth cameras, inertial sensors). The tracking system calibrates the sensors to accurately determine the pose of the display device. The calibrated parameters include extrinsic parameters (e.g., relative orientations and positions between sensors), and intrinsic parameters (e.g., internal camera or lens parameters).

Although the tracking system of the display device is factory calibrated, these (extrinsic/intrinsic) parameters may change over time (e.g., due to mechanical stress, temperature changes). The tracking system mitigates the changes by gradually updating the parameter values during runtime of the AR/VR application. However, the more the parameter values have diverged from the factory calibration, the longer it takes for the tracking system to "catch up" and obtain an accurate new estimate of the parameter values (e.g., the convergence time becomes longer). Keeping this convergence time short is important, because as long as the estimates are inaccurate, tracking performance is negatively impacted. Furthermore, the parameter values may be used by components other than the tracking system. For applications that rely on these components (e.g., VR/AR systems), it is important that the tracking system operates accurately right from the start (e.g., when the AR/VR application starts or is online).

The present application describes a method for reducing the convergence time for online parameter estimation at the start of a tracking system. Instead of just operating the tracking system whenever requested by the AR/VR application, the tracking system is periodically started and run for a short time (e.g., just until a new parameter estimation is obtained). This new parameter value estimation is then stored and later reused as a more up-to-date value (e.g., a new starting value for parameter estimation). Therefore, the last up-to-date parameter value is generally a more accurate starting point for parameter estimation when the tracking system is started the next time. Starting from the last up-to-date parameter value leads to a reduced convergence time and higher tracking accuracy immediately after the start of the tracking system.

In one example embodiment, the present application describes a method for calibrating a visual-inertial tracking system comprising: operating, at a device, the visual-inertial tracking system without receiving a tracking request from a virtual object display application; in response to operating the visual-inertial tracking system, accessing sensor data from a plurality of sensors of the device; identifying, based on the sensor data, a first calibration parameter value of the visual-inertial tracking system; storing the first calibration parameter value; detecting the tracking request from the virtual object display application to the visual-inertial tracking system; and in response to detecting the tracking request, accessing the first calibration parameter value and determining a second calibration parameter value from the first calibration parameter value.

As a result, one or more of the methodologies described herein facilitate solving the technical problem of power consumption saving and efficient calibration by periodically operating the tracking system to determine a parameter value, storing the latest parameter value, and using the last parameter value as a starting point the next time the tracking system is requested by an application. The presently described method provides an improvement to an operation of the functioning of a computer by providing power consumption reduction and fastest calibration computation. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a visual inertial tracking system 108. The visual inertial tracking system 108 tracks the pose (e.g., position and orientation) of the AR/VR display device 106 relative to the real-world environment 110 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. In one example, the AR/VR display device 106 displays virtual content based on the pose of the AR/VR display device 106 relative to the real-world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7 to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
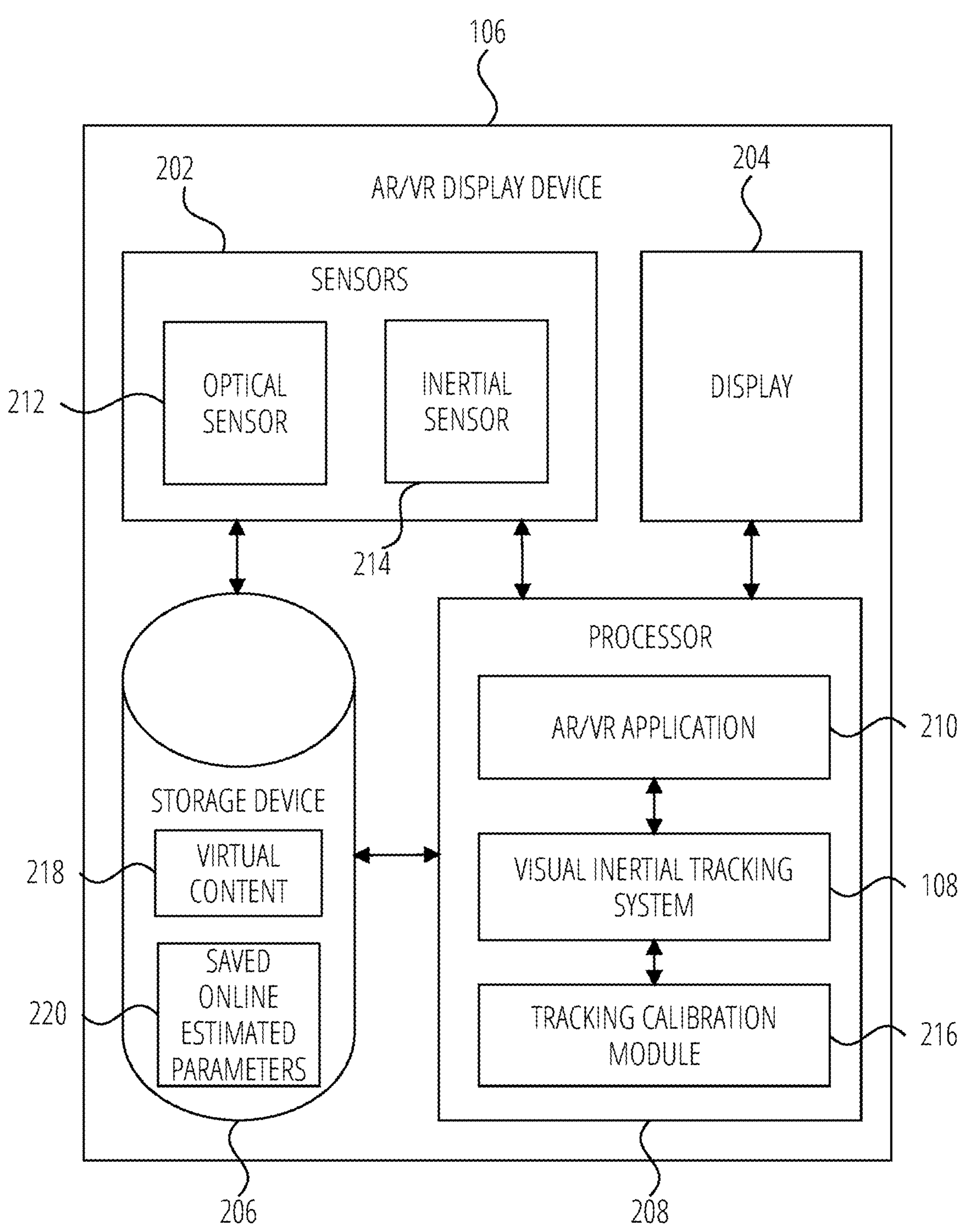
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 208, and a storage device 206. Examples of AR/VR display device 106 include a wearable computing device, a mobile computing device, a navigational device, a portable media device, or a smart phone.

The sensors 202 include, for example, an optical sensor 212 (e.g., camera such as a color camera, a thermal camera, a depth sensor and one or multiple grayscale, global/rolling shutter tracking cameras) and an inertial sensor 214 (e.g., gyroscope, accelerometer). Other examples of sensors 202 include a proximity or location sensor (e.g., near field communication, GPS, Bluetooth, Wi-Fi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes an AR/VR application 210, a visual inertial tracking system 108, and a tracking calibration module 216. The AR/VR application 210 detects and identifies a physical environment or the physical object 104 using computer vision. The AR/VR application 210 retrieves virtual content (e.g., 3D object model) based on the identified physical object 104 or physical environment. The AR/VR application 210 renders the virtual object in the display 204. In one example embodiment, the AR/VR application 210 includes a local rendering engine that generates a visualization of virtual content overlaid (e.g., superimposed upon, or otherwise displayed in tandem with) on an image of the physical object 104 captured by the optical sensor 212. A visualization of the virtual content may be manipulated by adjusting a position of the physical object 104 (e.g., its physical location, orientation, or both) relative to the optical sensor 212. Similarly, the visualization of the virtual content may be manipulated by adjusting a pose of the AR/VR display device 106 relative to the physical object 104. For a VR application, the AR/VR application 210 displays the virtual content in the display 204 at a location (in the display 204) determined based on a pose of the AR/VR display device 106.

The visual inertial tracking system 108 estimates a pose of the AR/VR display device 106. For example, the visual inertial tracking system 108 uses image data and corresponding inertial data from the optical sensor 212 and the inertial sensor 214 to track a location and pose of the AR/VR display device 106 relative to a frame of reference (e.g., real world environment 110). In one example embodiment, the visual inertial tracking system 108 operates independently and asynchronously from the AR/VR application 210. For example, the visual inertial tracking system 108 operates offline without receiving any tracking request from the AR/VR application 210. In another example, the visual inertial tracking system 108 operates periodically (e.g., every n second, m minutes) regardless of whether the AR/VR application 210 is running at the AR/VR display device 106.

The tracking calibration module 216 initially calibrates the internal visual odometry system (e.g., optical sensor 212, inertial sensor 214) of the visual inertial tracking system 108 based on default calibration parameter values (e.g., factory calibration). When the AR/VR application 210 operates, the visual inertial tracking system 108 may be referred to as online. When the AR/VR application 210 stops operating, the visual inertial tracking system 108 may be referred to as offline.

In one example embodiment, instead of running the visual inertial tracking system 108 whenever requested by the AR/VR application 210, the tracking calibration module 216 directs the visual inertial tracking system 108 to periodically start and run for a short period of time until a new parameter estimation is obtained. The tracking calibration module 216 stores the new estimation in the storage device 206. The tracking calibration module 216 re-uses the new estimation as a more up-to-date starting point for another parameter estimation when the visual inertial tracking system 108 is started the next time. Using the new estimation as a starting point for another parameter estimation leads to a reduced convergence time and higher tracking accuracy immediately after the start of the visual inertial tracking system 108.

The storage device 206 stores virtual content 218 and saved online estimated parameters 220. The virtual content 218 includes, for example, a database of visual references (e.g., images of physical objects) and corresponding experiences (e.g., three-dimensional virtual object models). The saved online estimated parameters 220 include, for example, the latest estimated parameter values for the visual inertial tracking system 108. In one example, the saved online estimated parameters 220 updates the latest estimated parameter value based on the latest estimated parameter value determined by a periodic operation of the visual inertial tracking system 108.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
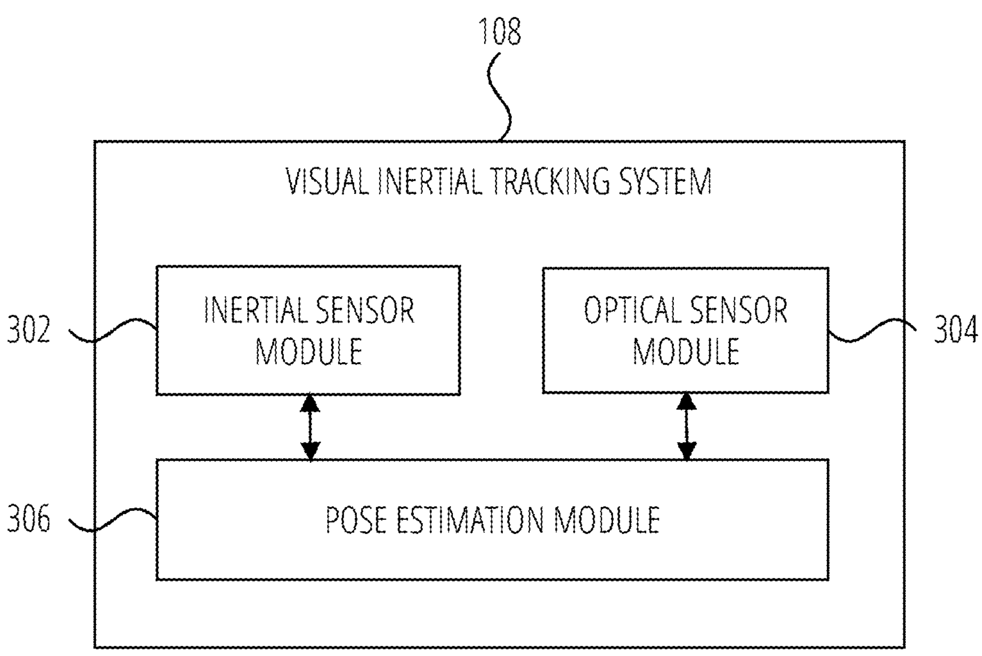
FIG. 3 is a block diagram illustrating a visual inertial tracking system in accordance with one example embodiment.

FIG. 3 illustrates the visual inertial tracking system 108 in accordance with one example embodiment. The visual inertial tracking system 108 includes, for example, an inertial sensor module 302, an optical sensor module 304, and a pose estimation module 306. The inertial sensor module 302 accesses inertial sensor data from the inertial sensor 214. The optical sensor module 304 accesses optical sensor data from the optical sensor 212.

The pose estimation module 306 determines a pose (e.g., location, position, orientation) of the AR/VR display device 106 relative to a frame of reference (e.g., real world environment 110). In one example embodiment, the pose estimation module 306 includes a visual odometry system that estimates the pose of the AR/VR display device 106 based on 3D maps of feature points from images captured with the optical sensor 212 and the inertial sensor data captured with the inertial sensor 214. The optical sensor module 304 accesses image data from the optical sensor 212.

In one example embodiment, the pose estimation module 306 computes the position and orientation of the AR/VR display device 106. The AR/VR display device 106 includes one or more optical sensor 212 mounted on a rigid platform (a frame of the AR/VR display device 106) with one or more inertial sensor 214. The optical sensor 212 can be mounted with non-overlapping (distributed aperture) or overlapping (stereo or more) fields-of-view.

In some example embodiments, the pose estimation module 306 includes an algorithm that combines inertial information from the inertial sensor 214 and image information from the optical sensor 212 that are coupled to a rigid platform (e.g., AR/VR display device 106) or a rig. In one embodiment, a rig may consist of multiple cameras mounted on a rigid platform with an inertial navigation unit (e.g., inertial sensor 214). A rig may thus have at least one inertial navigation unit and at least one camera.

Figure 4:
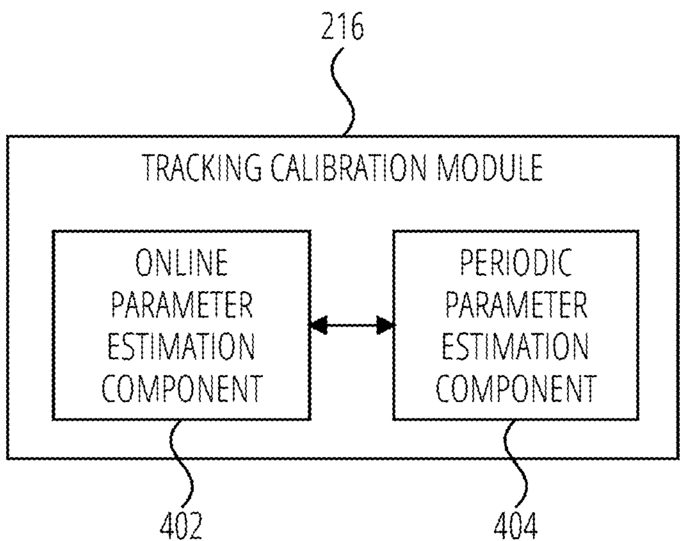
FIG. 4 is a block diagram illustrating a tracking calibration module in accordance with one example embodiment.

FIG. 4 is a block diagram illustrating a tracking calibration module 216 in accordance with one example embodiment. The tracking calibration module 216 includes an online parameter estimation component 402 and a periodic parameter estimation component 404.

The online parameter estimation component 402 operates the visual inertial tracking system 108 in response to detecting that the AR/VR application 210 is requesting a tracking operation. In one example embodiment, the online parameter estimation component 402 accesses a latest estimated calibration parameter values stored in the saved online estimated parameters 220. The online parameter estimation component 402 uses the latest estimated parameter values to calculate updated calibration parameter values.

The periodic parameter estimation component 404 periodically operates the visual inertial tracking system 108 to calculate the latest calibration parameter values. In one example, the periodic parameter estimation component 404 periodically operates the visual inertial tracking system 108 every n seconds. In another example, the periodic parameter estimation component 404 operates the visual inertial tracking system 108 in response to detecting a trigger event (e.g., temperature sensor indicates large change, accelerometer detects large change (e.g., device falling on the floor), "wear"-detector triggers (e.g., user putting on/wearing AR glasses, which causes mechanical stress on the frame), low battery power). The periodic parameter estimation component 404 stops the visual inertial tracking system 108 after the latest up-to-date estimated parameter value is available. The periodic parameter estimation component 404 stores the up-to-date estimated parameter value as the latest saved online estimated parameters 220 in storage device 206.

Figure 5:
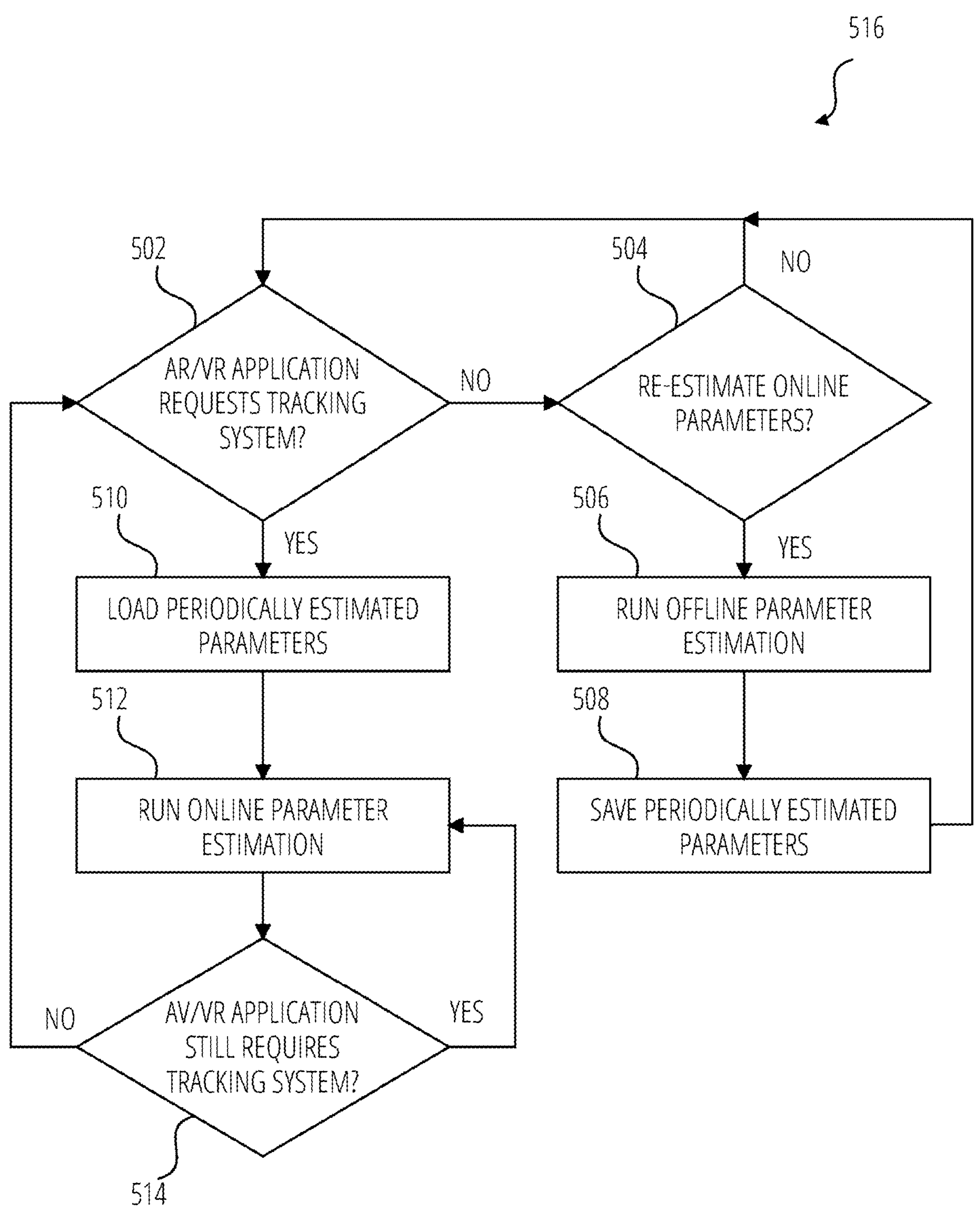
FIG. 5 is a flow diagram illustrating a parameter estimation operation in accordance with one example embodiment.

FIG. 5 is a flow diagram illustrating a parameter estimation operation 516 in accordance with one example embodiment. Operations in the parameter estimation operation 516 may be performed by the visual inertial tracking system 108, using Components (e.g., modules, engines) described above with respect to FIG. 2 and FIG. 3. Accordingly, the parameter estimation operation 516 is described by way of example with reference to the visual inertial tracking system 108 and tracking calibration module 216. However, it shall be appreciated that at least some of the operations may be deployed on various other hardware configurations or be performed by similar Components residing elsewhere. For example, some of the operations may be performed at the AR/VR application 210.

At decision block 502, the tracking calibration module 216 determines whether the AR/VR application 210 is requesting tracking operations from the visual inertial tracking system 108. If the tracking calibration module 216 determines that the AR/VR application 210 is requesting tracking operations from the visual inertial tracking system 108, the process proceeds to block 510, block 512, and decision block 514.

At block 510, the tracking calibration module 216 loads or retrieves a latest estimated parameter value from the storage device 206. At block 512, the tracking calibration module 216 calculates an updated latest calibration parameter value starting from the retrieved estimated parameter value. At decision block 514, the tracking calibration module 216 determines whether the AR/VR application 210 still requires tracking operations from the visual inertial tracking system 108. If the AR/VR application 210 does not need any further tracking operations from the visual inertial tracking system 108, the process returns back to decision block 502.

If the tracking calibration module 216 determines that the AR/VR application 210 is not requesting tracking operations from the visual inertial tracking system 108, the process continues to decision block 504, block 506, and block 508. At decision block 504, the tracking calibration module 216 determines whether the re-estimate the latest parameter value based on a last operation of the AR/VR application 210. At block 506, the tracking calibration module 216 operates the visual inertial tracking system 108 offline (e.g., without running the AR/VR application 210). At block 508, the tracking calibration module 216 saves the latest estimated parameter value and stops a tracking operation of the visual inertial tracking system 108.

Figure 6:
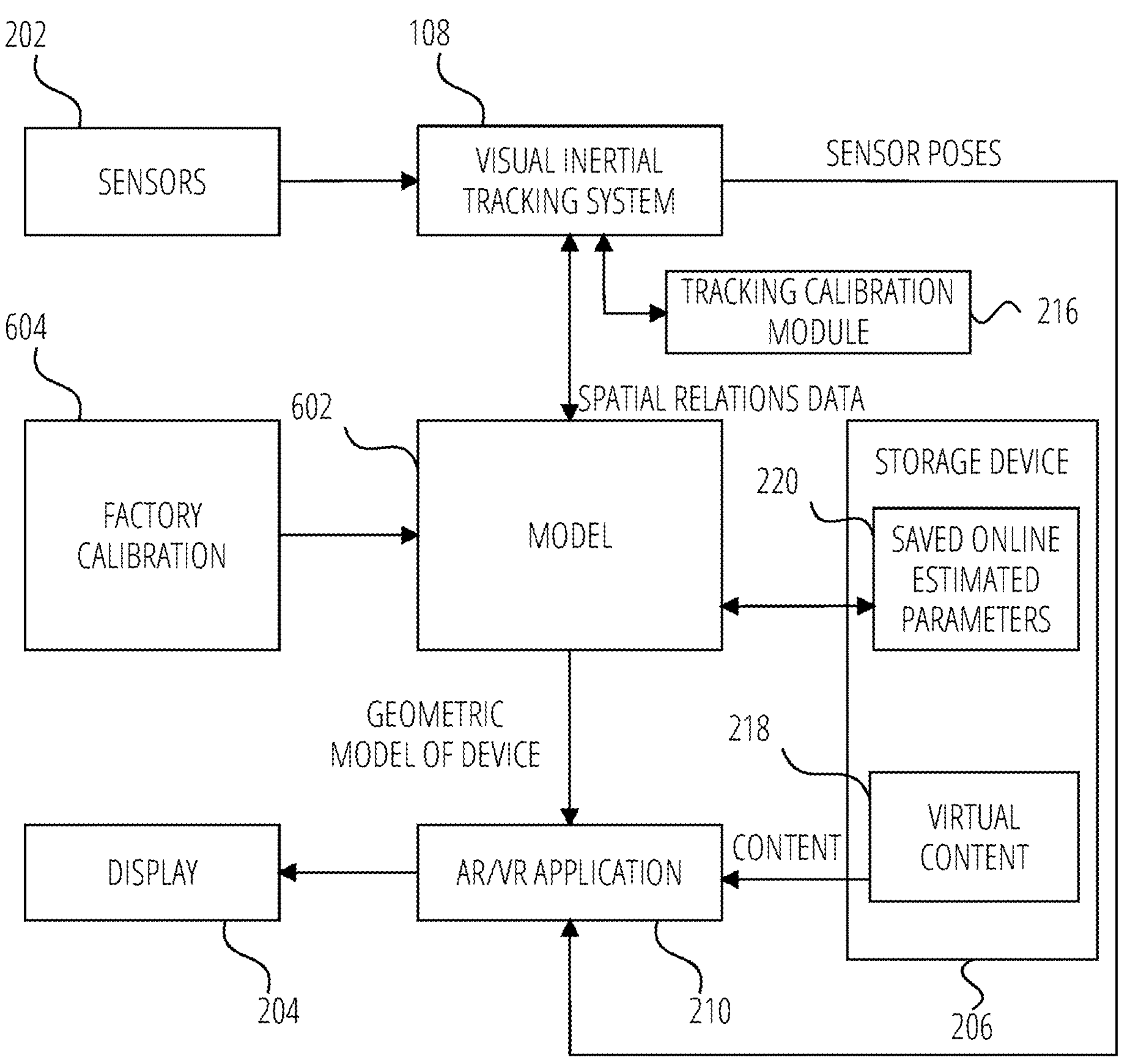
FIG. 6 is a block diagram illustrating a process in accordance with one example embodiment.

FIG. 6 is a block diagram illustrating an example process in accordance with one example embodiment. The visual inertial tracking system 108 receives sensor data from sensors 202 to determine a pose of the AR/VR display device 106. The tracking calibration module 216 calibrates the sensor data based on the latest parameter estimated values (e.g., spatial relations between the cameras and IMU, IMU biases, bending of the frame resulting a displacement of sensors disposed at pre-defined locations in the AR/VR display device 106, auto exposure). The tracking calibration module 216 stores the latest estimated parameter values (e.g., saved online estimated parameters 220) in the storage device 206.

The calibrated spatial relations data is provided to a model 602 of the visual inertial tracking system 108. The model 602 is initially determined with the factory calibration 604 and the data from the visual inertial tracking system 108. In one example embodiment, the model 602 is determined based on data from the visual inertial tracking system 108 and the saved online estimated parameters 220. The model 602 provides the geometric model of the AR/VR display device 106 to the AR/VR application 210.

The AR/VR application 210 retrieves virtual content 218 from the storage device 206 and causes the virtual content 218 to be displayed at a location based on the geometric model of the AR/VR display device 106.

Figure 7:
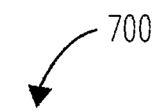
FIG. 7 is a flow diagram illustrating a method for storing the latest estimated parameter value in accordance with one example embodiment.
Figure 7:
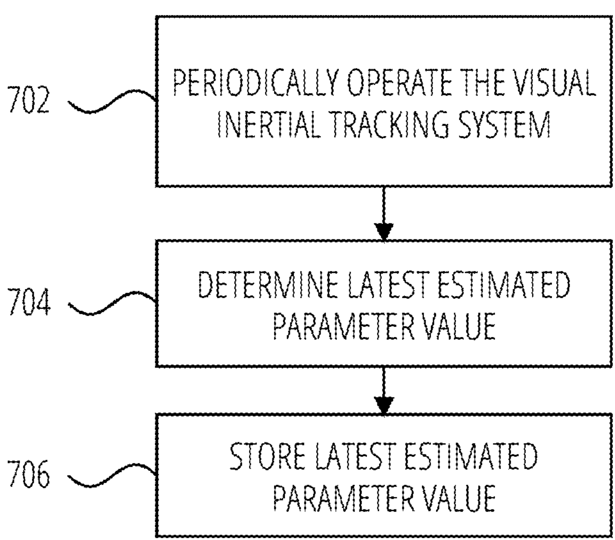

FIG. 7 is a flow diagram illustrating a routine 700 for updating visual odometry of an AR display device in accordance with one example embodiment. Operations in the routine 700 may be performed by the visual inertial tracking system 108, using Components (e.g., modules, engines) described above with respect to FIG. 2. Accordingly, the routine 700 is described by way of example with reference to the tracking calibration module 216. However, it shall be appreciated that at least some of the operations of the routine 700 may be deployed on various other hardware configurations or be performed by similar Components residing elsewhere.

In block 702, the periodic parameter estimation component 404 periodically operates the visual inertial tracking system 108. In block 704, the visual inertial tracking system 108 determines the latest estimated parameter value. In block 706, the periodic parameter estimation component 404 stores the latest estimated parameter value.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
FIG. 8 is a flow diagram illustrating a method for calibrating a visual inertial tracking system in accordance with one example embodiment.
Figure 8:
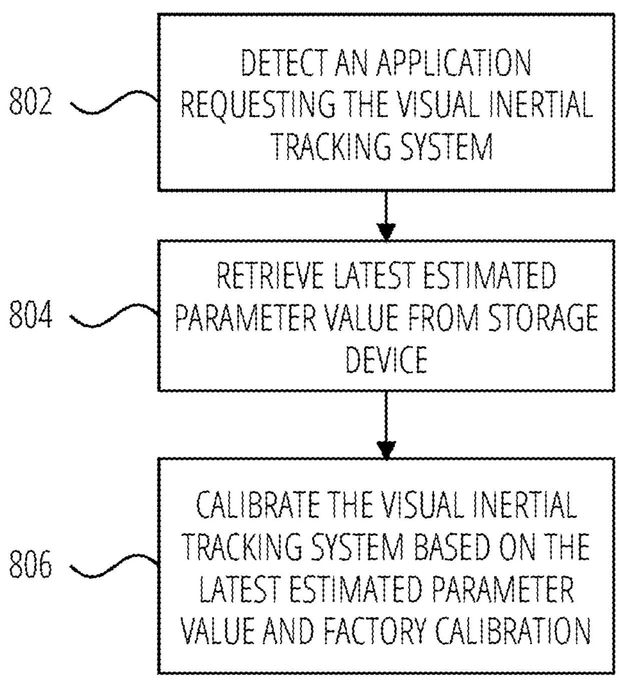

FIG. 8 is a flow diagram illustrating a routine 800 for updating visual odometry of an AR display device in accordance with one example embodiment. Operations in the routine 800 may be performed by the tracking calibration module 216, using Components (e.g., modules, engines) described above with respect to FIG. 2. Accordingly, the routine 800 is described by way of example with reference to the tracking calibration module 216. However, it shall be appreciated that at least some of the operations of the routine 800 may be deployed on various other hardware configurations or be performed by similar components residing elsewhere.

In block 802, the online parameter estimation component 402 detects an application requesting the visual inertial tracking system 108. In block 804, the online parameter estimation component 402 retrieves the latest estimated parameter value from the storage device 206. In block 806, the online parameter estimation component 402 calibrates the visual inertial tracking system 108 based on the latest estimated parameter value and factory calibration.

Figure 9:
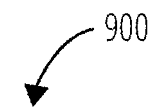
FIG. 9 is a flow diagram illustrating a method for triggering the visual internal tracking system in accordance with one example embodiment.
Figure 9:
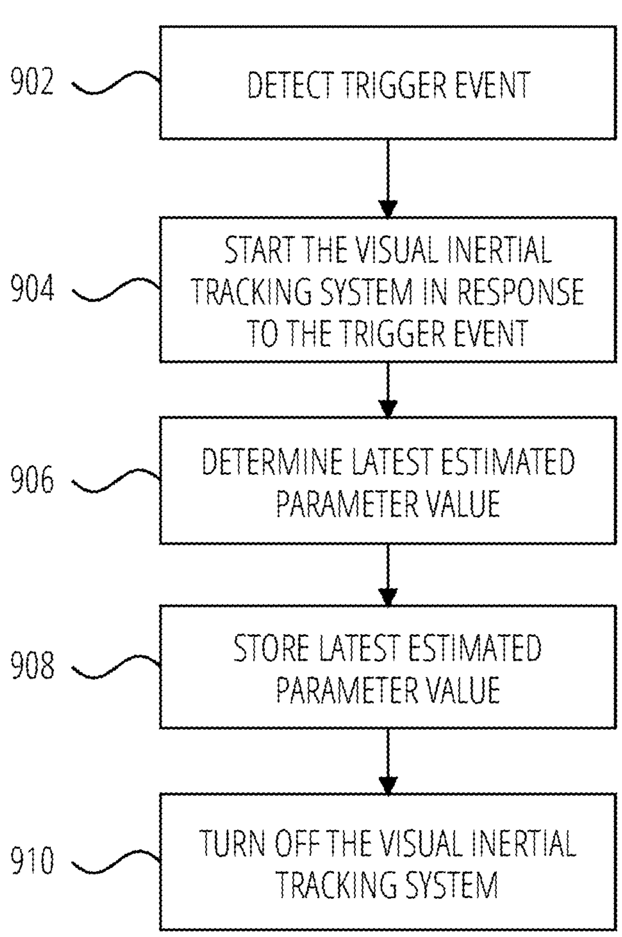

FIG. 9 is a flow diagram illustrating a routine 900 for updating visual odometry of an AR display device in accordance with one example embodiment. Operations in the routine 900 may be performed by the tracking calibration module 216, using Components (e.g., modules, engines) described above with respect to FIG. 3. Accordingly, the routine 900 is described by way of example with reference to the tracking calibration module 216. However, it shall be appreciated that at least some of the operations of the routine 900 may be deployed on various other hardware configurations or be performed by similar Components residing elsewhere.

In block 902, the periodic parameter estimation component 404 detects a trigger event. In block 904, the periodic parameter estimation component 404 starts the visual inertial tracking system 108 in response to the trigger event. In block 906, the periodic parameter estimation component 404 determines a latest estimated parameter value. In block 908, the periodic parameter estimation component 404 stores the latest estimated parameter value in the storage device 206. In block 910, the periodic parameter estimation component 404 turns off the visual inertial tracking system 108.

Figure 10:
FIG. 10 is a flow diagram illustrating a method for calibrating a visual-inertial tracking system in accordance with one example embodiment.
Figure 10:
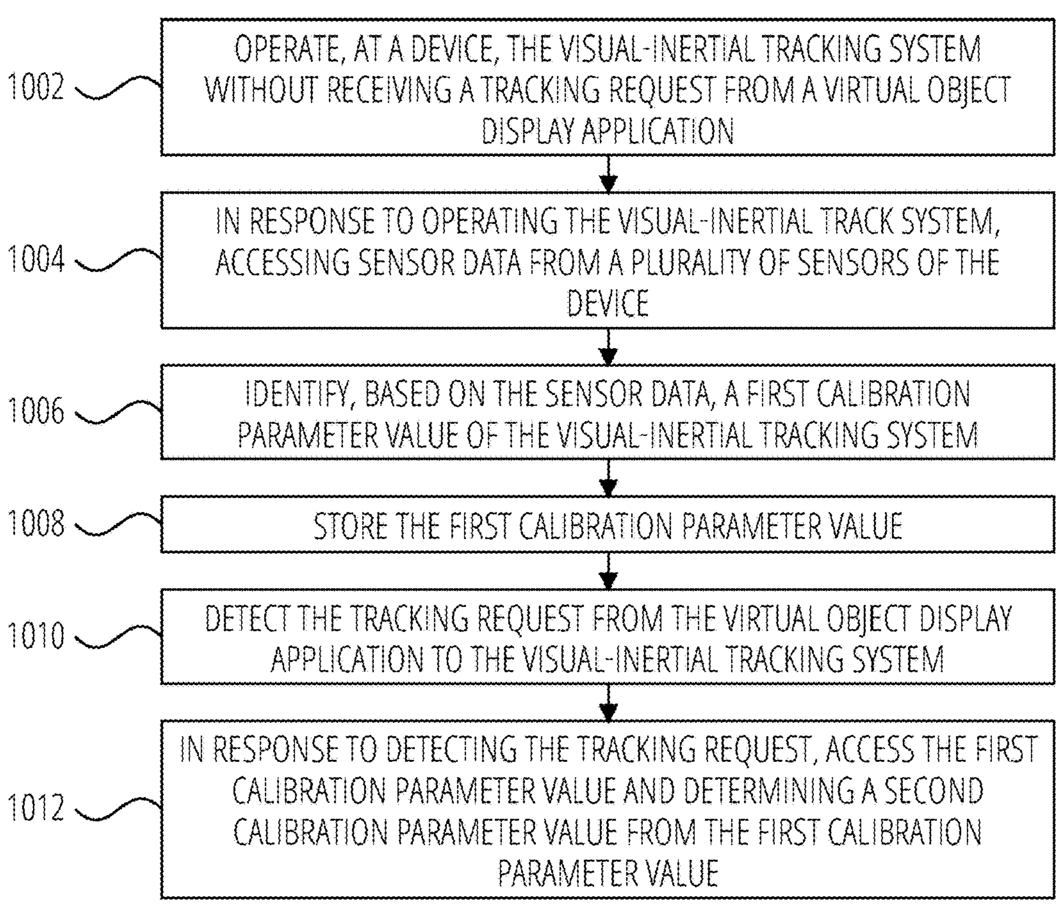

FIG. 10 is a flow diagram illustrating a method for calibrating a visual-inertial tracking system in accordance with one embodiment. In block 1002, routine 1000 operates, at a device, the visual-inertial tracking system without receiving a tracking request from a virtual object display application. In block 1004, routine 1000 in response to operating the visual-inertial tracks system, accessing sensor data from a plurality of sensors of the device. In block 1006, routine 1000 identifies, based on the sensor data, a first calibration parameter value of the visual-inertial tracking system. In block 1008, routine 1000 stores the first calibration parameter value. In block 1010, routine 1000 detects the tracking request from the virtual object display application to the visual-inertial tracking system. In block 1012, routine 1000 in response to detecting the tracking request, accesses the first calibration parameter value and determining a second calibration parameter value from the first calibration parameter value.

Figure 11:
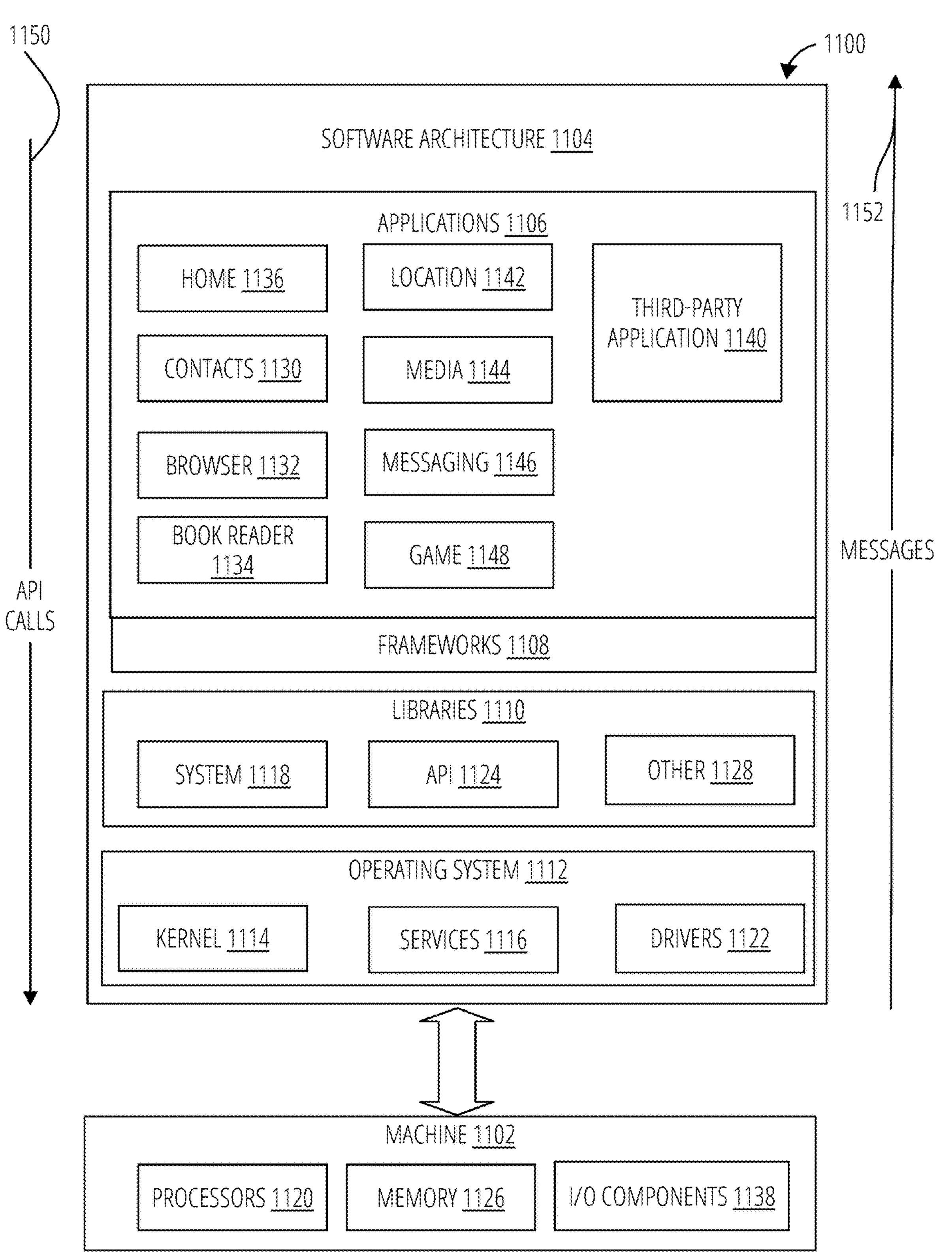
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes Processors 1120, memory 1126, and I/O Components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Figure 12:
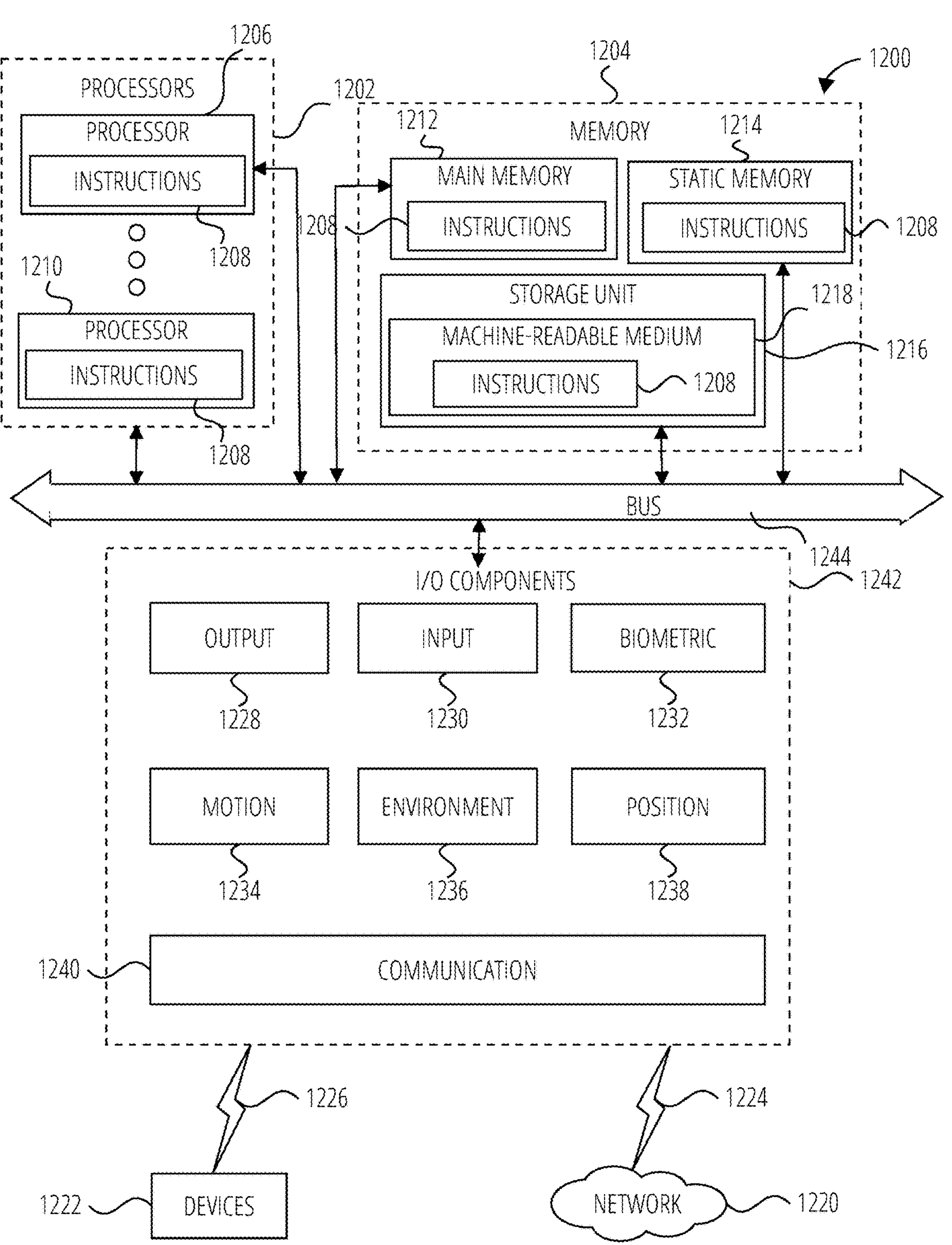
FIG. 12 is a diagrammatic representation of a machine in the form of a computer system within which a set of instructions may be executed for causing the machine to perform any one or more of the methodologies discussed herein, according to one example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for calibrating a visual-inertial tracking system comprising: operating, at a device, the visual-inertial tracking system without receiving a tracking request from a virtual object display application; in response to operating the visual-inertial tracking system, accessing sensor data from a plurality of sensors of the device; identifying, based on the sensor data, a first calibration parameter value of the visual-inertial tracking system; storing the first calibration parameter value; detecting the tracking request from the virtual object display application to the visual-inertial tracking system; and in response to detecting the tracking request, accessing the first calibration parameter value and determining a second calibration parameter value from the first calibration parameter value.

Example 2 includes example 1, wherein operating the visual-inertial tracking system further comprises: periodically accessing the sensor data from the plurality of sensors, wherein the visual-inertial tracking system operates independently from the virtual object display application.

Example 3 includes example 1, further comprising: detecting a calibration trigger event at the device, wherein operating the visual-inertial tracking system is in response to detecting the calibration trigger event.

Example 4 includes example 3, wherein the trigger event comprises at least one of a temperature change exceeding a temperature threshold, an accelerometer sensor value exceeding an accelerometer threshold value, a battery level of the device exceeding a battery threshold value, a user-activation of the device, or a detection that the device is worn by a user.

Example 5 includes example 1, wherein identifying the first calibration parameter value is based on a convergence between a first virtual object data point location and a second virtual object data point location, the first virtual object data point location being determined based on the sensor data that are adjusted with the first parameter value, the second virtual object data point location being determined based on the sensor data that are adjusted with a default calibration parameter value of the device.

Example 6 includes example 1, further comprising: turning off the visual-inertial tracking system after storing the first calibration parameter value.

Example 7 includes example 1, further comprising: calibrating the visual-inertial tracking system with the first calibration parameter value before detecting the tracking request from the virtual object display application.

Example 8 includes example 1, further comprising: calibrating the visual-inertial tracking system with the second calibration parameter value after detecting the tracking request from the virtual object display application.

Example 9 includes example 1, wherein determining the second calibration parameter value further comprises: replacing a starting value comprising the default calibration value with the first calibration parameter value; and performing a calibration of the visual-inertial tracking system starting with the starting value.

Example 10 includes example 1, wherein storing the first calibration parameter value further comprises: storing the first calibration value in a storage device of the device or at a server.

Example 11 is a computing apparatus comprising: a processor; and a memory storing instructions that, when executed by the processor, configure the apparatus to perform operations comprising: operate, at a device, the visual-inertial tracking system without receiving a tracking request from a virtual object display application; in response to operating the visual-inertial track system, accessing sensor data from a plurality of sensors of the device; identify, based on the sensor data, a first calibration parameter value of the visual-inertial tracking system; store the first calibration parameter value; detect the tracking request from the virtual object display application to the visual-inertial tracking system; and in response to detecting the tracking request, access the first calibration parameter value and determining a second calibration parameter value from the first calibration parameter value.

Example 12 includes example 11, wherein operating the visual-inertial track system further comprises: periodically access the sensor data from the plurality of sensors, wherein the visual-inertial track system operates independently from the virtual object display application.

Example 13 includes example 11, wherein the instructions further configure the apparatus to: detect a calibration trigger event at the device, wherein operating the visual-inertial track system is in response to detecting the calibration trigger event.

Example 14 includes example 13, wherein the trigger event comprises at least one of a temperature change exceeding a temperature threshold, an accelerometer sensor value exceeding an accelerometer threshold value, a battery level of the device exceeding a battery threshold value, a user-activation of the device, or a detection that the device is worn by a user.

Example 15 includes example 11, wherein identifying the first calibration parameter value is based on a convergence between a first virtual object data point location and a second virtual object data point location, the first virtual object data point location being determined based on the sensor data that are adjusted with the first parameter value, the second virtual object data point location being determined based on the sensor data that are adjusted with a default calibration parameter value of the device.

Example 16 includes example 11, wherein the instructions further configure the apparatus to: turn off the visual-inertial tracking system after storing the first calibration parameter value.

Example 17 includes example 11, wherein the instructions further configure the apparatus to: calibrate the visual-inertial tracking system with the first calibration parameter value before detecting the tracking request from the virtual object display application.

Example 18 includes example 11, wherein the instructions further configure the apparatus to: calibrate the visual-inertial tracking system with the second calibration parameter value after detecting the tracking request from the virtual object display application.

Example 19 includes example 11, wherein determining the second calibration parameter value further comprises: replace a starting value comprising the default calibration value with the first calibration parameter value; and perform a calibration of the visual-inertial tracking system starting with the starting value.

Example 20 includes a non-transitory computer-readable storage medium, the computer-readable storage medium including instructions that when executed by a computer, cause the computer to perform operations comprising: operate, at a device, a visual-inertial tracking system without receiving a tracking request from a virtual object display application; in response to operating the visual-inertial track system, accessing sensor data from a plurality of sensors of the device; identify, based on the sensor data, a first calibration parameter value of the visual-inertial tracking system; store the first calibration parameter value; detect the tracking request from the virtual object display application to the visual-inertial tracking system; and in response to detecting the tracking request, access the first calibration parameter value and determining a second calibration parameter value from the first calibration parameter value.

What is claimed is:

1. A method comprising:

detecting a calibration trigger event at a wearable device;

in response to detecting the calibration trigger event, identifying, at the wearable device, a first calibration parameter value based on sensor data from a sensor of the wearable device;

storing the first calibration parameter value in a memory of the wearable device;

detecting a tracking request from an application at the wearable device; and in response to detecting the tracking request, using the first calibration parameter value as a starting point for estimating a second calibration parameter value of a visual-inertial tracking system of the wearable device.

2. The method of claim 1, wherein updating the first calibration parameter value is performed during an offline calibration parameter estimation of the visual-inertial tracking system, the offline calibration parameter estimation performed after an online calibration parameter estimation.

3. The method of claim 2, further comprising:

in response to detecting the tracking request, switching the offline calibration parameter estimation of the visual-inertial tracking system to the online calibration parameter estimation and using the first calibration parameter value as the starting point for estimating the second calibration parameter value of the visual-inertial tracking system.

4. The method of claim 1, wherein detecting the calibration trigger event comprises:

identifying a sensor threshold corresponding to the sensor; and determining that the sensor data exceeds the sensor threshold.

5. The method of claim 1, wherein the calibration trigger event comprises at least one of a temperature change exceeding a temperature threshold, an accelerometer change exceeding an accelerometer threshold, or a battery level transgressing a battery threshold.

6. The method of claim 1, wherein detecting the calibration trigger event comprises:

detecting that the wearable device is worn by a user.

7. The method of claim 1, further comprising:

operating, absent a tracking request, the visual-inertial tracking system by periodically accessing the sensor data from the sensor of the wearable device;

periodically updating, at the wearable device, the first calibration parameter value based on the sensor data; and storing, in the memory of the wearable device, the updated first calibration parameter value.

8. The method of claim 1, further comprising:

turning off the visual-inertial tracking system after storing the first calibration parameter value at the wearable device; and activating the visual-inertial tracking system in response to detecting the tracking request from the application.

9. The method of claim 1, further comprising:

calibrating the visual-inertial tracking system with the first calibration parameter value before operating the application or with the second calibration parameter value after detecting the tracking request from the application.

10. The method of claim 1, wherein the application comprises an augmented reality application.

11. A wearable device comprising:

a processor; and a memory storing instructions that, when executed by the processor, configure the wearable device to perform operations comprising:

detecting a calibration trigger event at a wearable device;

in response to detecting the calibration trigger event, identifying, at the wearable device, a first calibration parameter value based on sensor data from a sensor of the wearable device;

storing the first calibration parameter value in a memory of the wearable device;

detecting a tracking request from an application at the wearable device; and in response to detecting the tracking request, using the first calibration parameter value as a starting point for estimating a second calibration parameter value of a visual-inertial tracking system of the wearable device.

12. The wearable device of claim 11, wherein updating the first calibration parameter value is performed during an offline calibration parameter estimation of the visual-inertial tracking system, the offline calibration parameter estimation performed after an online calibration parameter estimation.

13. The wearable device of claim 12, wherein the operations further comprise:

in response to detecting the tracking request, switching the offline calibration parameter estimation of the visual-inertial tracking system to the online calibration parameter estimation and using the first calibration parameter value as the starting point for estimating the second calibration parameter value of the visual-inertial tracking system.

14. The wearable device of claim 11, wherein detecting the calibration trigger event comprises:

identifying a sensor threshold corresponding to the sensor; and determining that the sensor data exceeds the sensor threshold.

15. The wearable device of claim 11, wherein the calibration trigger event comprises at least one of a temperature change exceeding a temperature threshold, an accelerometer change exceeding an accelerometer threshold, or a battery level transgressing a battery threshold.

16. The wearable device of claim 11, wherein detecting the calibration trigger event comprises:

detecting that the wearable device is worn by a user.

17. The wearable device of claim 11, wherein the operations further comprise:

operating, absent a tracking request, the visual-inertial tracking system by periodically accessing the sensor data from the sensor of the wearable device;

periodically updating, at the wearable device, the first calibration parameter value based on the sensor data; and storing, in the memory of the wearable device, the updated first calibration parameter value.

18. The wearable device of claim 11, wherein the operations further comprise:

turning off the visual-inertial tracking system after storing the first calibration parameter value at the wearable device; and activating the visual-inertial tracking system in response to detecting the tracking request from the application.

19. The wearable device of claim 11, wherein the operations further comprise:

calibrating the visual-inertial tracking system with the first calibration parameter value before operating the application or with the second calibration parameter value after detecting the tracking request from the application.

20. A non-transitory computer-readable storage medium, the computer-readable storage medium including instructions that when executed by a computer, cause the computer to perform operations comprising:

detecting a calibration trigger event at a wearable device;

in response to detecting the calibration trigger event, identifying, at the wearable device, a first calibration parameter value based on sensor data from a sensor of the wearable device;

storing the first calibration parameter value in a memory of the wearable device;

detecting a tracking request from an application at the wearable device; and in response to detecting the tracking request, using the first calibration parameter value as a starting point for estimating a second calibration parameter value of a visual-inertial tracking system of the wearable device.

* * * * *